Oct. 4, 1955 J. R. PIERCE Re. 24,070

STORAGE TUBE

Original Filed Jan. 29, 1948

INVENTOR
J. R. PIERCE

BY Hugh S. Wertz
ATTORNEY

United States Patent Office

Re. 24,070
Reissued Oct. 4, 1955

24,070

STORAGE TUBE

John R. Pierce, Berkeley Heights, N. J., assignor to Bell Telephone Laboratories, Incorporated, New York, N. Y., a corporation of New York Original No. 2,527,652, dated October 31, 1950, Serial No. 5,043, January 29, 1948. Application for reissue December 31, 1953, Serial No. 401,743

9 Claims. (Cl. 250—27)

Matter enclosed in heavy brackets [ ] appears in the original patent but forms no part of this reissue specification; matter printed in italics indicates the additions made by reissue.

This invention relates to storage devices and more particularly to devices of this character utilizing electron beams for storing and reproducing electrical signals.

It is an object of this invention to utilize in storage tubes of the electron beam type materials exhibiting the property of electron bombardment induced conductivity.

It is another obpect of this invention to reduce, in storage tubes of this type, the distortions produced by stray secondary electrons.

[In the copending applications of D. E. Wooldridge, Serial No. 747,888, filed May 14, 1947, and K. G. McKay, Serial No. 789,667, filed December 4, 1947,]. In Patent *2,537,388, issued January 9, 1951, to D. E. Wooldridge, and Patent 2,543,039, issued February 27, 1951, to K. G. McKay,* there are disclosed various materials which exhibit the property known as bombardment induced conductivity. Each of these materials (such as, for example, diamond, zinc sulphide, magnesium oxide, silicon carbide and stibnite) is normally an insulator, but when it is struck by electrons (or other particles, such as alpha or beta particles, for example), it becomes conducting if at the time an electric field exists between opposite surfaces of the insulator. The bombarding particles penetrate the insulator, causing a disruptive separation of the positive and negative charges specific to the atoms which are affected by the bombarding particles. These charges are drawn toward the electrodes producing the electric field and this motion of charges constitutes a conduction current which is in many cases greatly in excess of the current of the bombarding particles.

Diamond is a favored solid insulator for this work (although other materials such as, for example, others mentioned in the Wooldridge and McKay [applications] *patents* can be used) because it can easily be obtained without sufficient impurities or imperfections to affect this high insulation resistance or its conducting properties under bombardment. The carbon atoms therein consist each of a nucleus exhibiting fixed units of positive charge, to which two electrons are tightly bound. This core is surrounded by four valence electrons. The carbon atoms are held together by "electron pair bonds" between adjacent atoms. The insulation resistance is high because the electron bonds are very tight. As a result of this tightness, very few electrons are displaced from their bonds by thermal agitation. This is not the case in, for example, metals, where a large number of electrons are continuously being displaced by thermal agitation and are relatively free to wander through the metal, this, under normal conditions, constituting the usual current in a metallic conducting medium.

When electron bombardment removes a valence electron from its bonds in an insulating target, producing a deficiency of one electron in the atomic structure immediately affected, this localized electron deficiency is called a "hole." Under an applied electric field the arrangement of the electrons is changed, and the location of any given hole will change. As a consequence, the hole can be conveniently regarded as a positive particle which is free to move under the influence of the field. Similarly, the electron freed from the bond in question constitutes a negative particle which is free to move under the influence of the electric field. If there is no applied field, any free electron or positive hole moves in accordance with thermal agitation and consequently has a completely random motion. Under an applied electric field, there is a directional motion superimposed on the random one. The order of mobility of the electrons in diamond is of the order of 1,000 centimeters per second for a field of one volt per centimeter. For a field of $10^4$ volts per centimeter the velocity therefore is $10^7$ centimeters per second. For a diamond crystal one millimeter thick, the transit time therefor is $10^{-8}$ seconds. The mobility of the electrons is affected by the number of "traps," that is, the presence of foreign atoms or imperfections in the crystal. If an electron gets into a trap, it takes a greater or less amount of time to get out, depending upon the thermal energy required. Further information on traps and other characteristics of diamond crystals is given in the Wooldridge and McKay [applications] *patents* referred to above.

In accordance with the present invention, there is provided a storage tube of the electron beam type including an electron target embodying material which exhibits the property of electron bombardment induced conductivity. Diamond is the preferred material for reasons given above. More specifically, the storage tube includes a target comprising a layer of diamond or other material exhibiting the property of electron bombardment induced conductivity coated on one side with a thin conducting metal layer and a metallic grid member facing the uncoated side thereof. The electron beam is caused to scan the uncoated side of the target through the grid member and at the same time the signal to be stored is applied across a resistor connected between the conducting layer and the grid member, a source of direct potential being also included in the circuit to bias the grid negatively with respect to the conducting layer. As the electron beam scans the target, the various elemental areas thereof are rendered successively conductive and the signals are stored as a charge distribution along the path the beam has swept out. In reproducing the signals, the beam is made to retrace its previous path.

The invention will be more readily understood by referring to the following description taken in connection with the accompanying drawing forming a part thereof in which.

Figure 1:
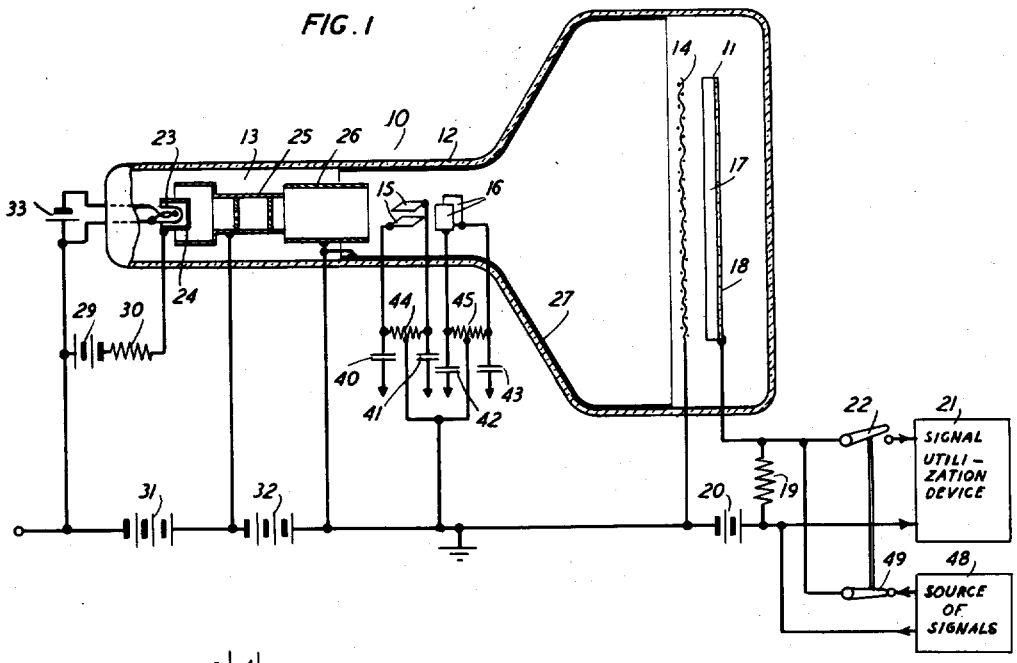
Fig. 1 is a schematic representation of a cathode ray storage tube of this invention together with certain of its associated circuits and auxiliary equipment.

Referring more particularly to the drawing, Fig. 1 shows, by way of example to illustrate the invention, a cathode ray storage tube 10 employing a target 11 containing material exhibiting the property of electron bombardment induced conductivity. The tube 10 comprises an evacuated container 12 enclosing the target 11, an electron gun 13 for generating, focussing and accelerating a beam of high velocity electrons toward this target, a mesh grid member 14 adjacent the target 11, and two sets of electrostatic deflecting plates 15 and 16 for causing the beam of electrons to scan a number of elemental areas in turn of a desired field on the target 11. The target 11, which will be described below in greater detail with reference to Fig. 2, comprises a layer of material 17 which exhibits the property of electron bombardment induced conductivity and which is coated on the side remote from the electron gun with a thin conducting metal layer 18. A resistor 19 and a source 20 of direct polarizing potential are connected in series between the metal layer 18 and the mesh grid member 14. A signal utilization device 21 is connected, through a switch 22, across the resistor 19.

The electron gun 13 preferably comprises a cathode 23, a control electrode or member 24, a first anode member 25, and a second and final anode comprising a cylindrical member 26 and a coating 27 of conducting material on the inside walls of the envelope 12 extending from the region of the cylinder 26 to the region of the target 11. The control electrode 24 is connected to the cathode 23 through a source 29 and a resistor 30 to place a negative bias on the control electrode. Any suitable source 33 can be utilized to heat the cathode 23. The first anode 25 and the final anode 26, 27 are placed at appropriate positive potentials with respect to the cathode 23 by means of the source 31 and the source 32. For example, the final anode 26, 27 can be from 1,000 to 10,000 or more volts positive with respect to the cathode and the first anode 25 can have an appropriate lower positive voltage for proper focussing. The negative terminal of the source 31 is connected to the cathode 23 and the positive terminal thereof is connected to the first anode 25, while the negative terminal of the source 32 is connected to the positive terminal of the source 31 and the positive terminal of source 32 is connected to the second anode 26, 27 and to ground. Batteries have, for convenience, been shown in the drawing but it is to be understood that any other means of producing direct voltages can be used instead.

Figure 2:
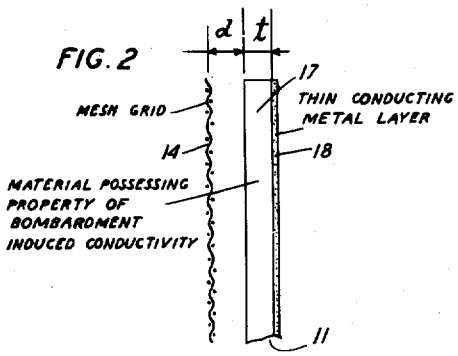
Fig. 2 is a schematic view showing, in greatly enlarged form, a portion of the target structure and associated conducting electrode of the tube shown in Fig. 1.

Reference will now be made to Fig. 2 which shows in enlarged scale a portion of the target 11 and its adjacent grid member 14. Fig. 2 has not been drawn to scale. As mentioned above, the target 11 comprises a thin layer 17 of insulating material which exhibits the property of electron bombardment induced conductivity and which has a thin metal coating 18 on the surface thereof remote from the gun 13. By way of example, the layer 17 is a very thin cut of diamond or a simulated sheet of diamond formed by a crystalline layer (preferably one particle thick) of diamond chips or diamond dust. Alternatively, the layer 17 can be of any other suitable material exhibiting this desired property. The layer 17 can be of the order of a millimeter thick, for example. The layer 18 is of any suitable material such as gold, silver, platinum or aluminum, for example.

The high velocity beam produced by the gun 13 is deflected in a desired manner (such as line by line) over the surface of the target 11 by means of appropriate potentials applied to the pairs of deflecting plates 15 and 16 by electrostatic sweep circuits (not shown). If, for example, the signal to be stored and later reproduced is a signal formed by the scanning of a complete frame of a television object, suitable sweep circuits of the cyclically recurring type can be used. As an example of a suitable sweep circuit of this type, reference is made to Patent 2,178,464, issued October 31, 1939, to M. W. Baldwin, Jr., which discloses balanced electrostatic sweep circuits suitable for television. Two sweep circuits are, of course, used, one for frame scanning and one for line scanning, and connections from these sweep circuits are made to the pairs of plates 15 and 16 by means of coupling condensers 40, 41, 42 and 43, respectively, of about 1 microfarad capacity each. Coupling resistances 44 and 45, of the order of many megohms each, are respectively connected across the pairs of plates 15 and 16. The mid-points of the resistances 44 and 45 are connected to the positive terminal of the source 32 so that the average of the potentials of the deflecting plates does not deviate more than slightly from the potential of the anodes 26, 27. This relationship is maintained to avoid changes in the sensitivity of the deflecting system and the consequent distortion of the image which would otherwise result. For a more complete description of the advantages of balanced sweep circuits for use with cathode ray television tubes, reference is made to the above-mentioned Baldwin patent and also to Patent 2,209,199, issued July 23, 1940, to Frank Gray. Since the signal being stored has associated therewith the usual frame and line frequency synchronizing signals together with blanking signals, the usual television synchronizing circuits can be used to initiate starting of each line of the scanning in turn and to blank the beam during its fly-back operation between lines. If it is desired to record a whole television signal, two tubes 10 like those shown in Fig. 1 can be used, each connected so as to record and reproduce during alternate frame periods in a manner similar to that disclosed in [a copending application of R. E. Graham, Serial No. 5,010, filed January 29, 1948.] *Patent 2,527,632 issued October 31, 1950, to R. E. Graham.*

The source of input signals 48 is connected across the resistor 19. A suitable switch 49 is shown connected in one of the leads between the source 48 and the resistor 19, the operation of the switch 49 being synchronized, by any suitable means, with that of the switch 22 in such a manner that when the switch 49 is in a closed position the switch 22 is in an open position, and vice versa. If two tubes 10 are used, the sweep circuits are operated continuously so that each tube records during one frame period and reproduces during the next.

The operation of the device shown in Fig. 1 will now be described. Assume that the signal to be stored on the layer 17 is a television video signal formed by scanning one frame. During the recording stage the switch member 49 is closed as shown on the drawing, while the switch 22 is open. The electron beam produced by the gun 13 is caused to scan, through the mesh grid 14 the uncoated side of the layer 17 and at the same time the signal to be stored is applied across the resistor 19 which is connected, in series with the source 20, between the surface 18 and the grid 14. As the electron beam scans the surface of the layer 17, the various elemental areas thereof are rendered successively conductive, and the signals are stored as a charge distribution along the path the beam sweeps out. The portion of the surface on which the beam falls thus attains substantially the same potential as the backing plate or layer 18. As the layer 17 is conducting where the beam strikes it and the surface has the same potential as the backing plate, the voltage gradient at the surface where the beam falls due to the signal is $$V' = \frac{V_s}{d}$$

Hence, a charge $\sigma$ per unit area is induced on the surface which is $$\sigma = -\epsilon \frac{V_s}{d}$$

where $\epsilon$ is the dielectric constant of vacuum which is $8.85 \times 10^{-12}$ farads per meter.

In reading the signal, the switch 49 is opened and the switch 22 is closed, and the output is applied to the signal utilization device 21 which may be, for example, a cathode ray oscilloscope, or another tube of the type shown in Fig. 1 if it is desired to impart a further delay to the signal, or any other device utilizing the reproduced signals which are delayed replicas of the original signals. In the reproducing step the electron beam is made to retrace the path which it took in writing the signal on the layer 17. This synchronization is accomplished by any suitable mechanical or electronic means. Suppose the resistance 19 has such a low value that the voltage drop caused by the stored charge flowing through it is very small. Then, as the beam sweeps along the path, the surface of the material 17 becomes conducting and the charge $\sigma$ flows through it.

Figure 3:
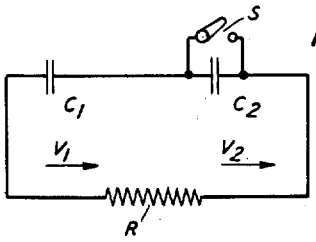
Fig. 3 is a schematic circuit diagram to aid in the understanding of the invention.

Fig. 3 shows an equivalent circuit by means of which the amount of charge flowing through the resistance 19 can be deduced. In Fig. 3, $C_1$ is the capacitance per unit area between the grid member 14 and the surface of the material 17. Condenser $C_2$ is the capacitance per unit area across the layer 17. When the electron beam strikes the material 17 it is equivalent to closing the switch S. Before the switch is closed, the voltage $V_2$ across $C_2$ is equal and opposite to the voltage $V_1$ across $C_1$ and $$V_1 = -V_2$$

The total charge per unit area on the face of the layer 17 is $$\sigma = -V_2C_2 + V_1C_1$$
$$= V_1(C_1 + C_2)$$
$$V_1 = \frac{\sigma}{C_1 + C_2}$$

After the switch S has been closed, this voltage appears across the capacitance $C_1$; the charge left on capacitance $C_1$ is then $$\sigma_1 = V_1C_1 = \frac{\sigma C_1}{C_1 + C_2}$$
$$\sigma_1 = \sigma/(1 + C_2/C_1)$$

Now, the ratio $C_2/C_1$ is $$C_2/C_1 = (d/t)(\epsilon_1/\epsilon)$$

Here d is the distance from the grid 14 to the face of the target 17 adjacent it, t is the thickness of the material 17, and $(\epsilon_1/\epsilon)$ is the ratio of the dielectric constant of the material 17 to the dielectric constant of vacuum.

Suppose the electron beam *is swept across the surface of layer 17 at a rate of v meters per second and* has a width w meters [and travels at a rate of v meters per second] *perpendicular to the direction of sweeping.* Then the area swept out per second is $$A = wv$$

The current flow through the resistor 19 is $$I = A\sigma_1 = wv\sigma_1$$

This will cause a voltage output $$V = IR$$

Thus it will follow from the above that the current can be expressed in terms of the voltage $V_s$ applied in storing the signal as follows:

$$V/V_s = \frac{\epsilon wvR}{[1 + (d/t)(\epsilon_1/\epsilon)]d}$$

Figure 4:
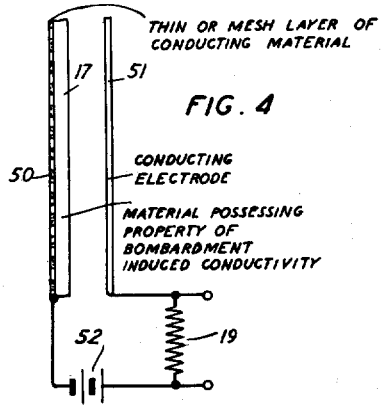
Fig. 4 shows a modification of the target structure and associated conducting electrode of the device shown in Fig. 1.

It is not necessary that the electron beam used to produce bombardment induced conductivity strike the free surface of the layer 17. In Fig. 4, the electron beam passes through the layer 50 which is either a very thin layer of conducting material or which is a deposited grid or mesh member, and the grid member 14 of Fig. 1 is replaced in function by a plane electrode 51 spaced from the free surface of the layer 17. A [direct current] *D. C. voltage* source 52 can produce a biasing voltage in either direction, as it has been found that a bias usually gives an improved operation in connection with the operation of bombardment induced conductivity.

Various other modifications can be made in the embodiment described above without departing from the spirit of the invention the scope of which is indicated in the claims. The specific potentials applied to the various elements are herein given merely by way of example and it is to be understood that their values may be made materially different without changing the general method of operation of the devices described herein. For example, the type of crystal material used and its thickness materially affects the operating potentials required.

What is claimed is:

[1. A recorder and reproducer of signals comprising a target for electrons including a layer of electrically insulating material which possesses the property of becoming an electrical conductor when bombarded with electrons, an electrode member adjacent said target, electric circuit means for applying between said layer and said electrode a signal voltage to be stored, means for forming a beam of electrons and for causing it to strike said layer as said signals are being applied thereto, thereby forming a series of charges on said layer, and means for removing said charges at a later time to control the production of signals.]

2. A device for the storage of electrical signals comprising a target for electrons including a layer of material which is normally electrically insulating but which has the property of becoming electrically conducting when bombarded with electrons, a metal coating on one surface of said layer, a conducting electrode member on the side of said layer remote from said coating but spaced from said layer, [and electric circuit means for applying a signal voltage to be stored between said coating and said electrode member] *first electric circuit means connected between said coating and said electrode member during predetermined time intervals for applying a signal voltage to be stored, second electric circuit means connected between said coating and said electrode member during time intervals other than said predetermined time intervals for extracting the stored signal voltage, and means including an electron gun for projecting a high velocity electron beam against the surface of said layer for rendering conductive the portion of said layer struck by said beam during both the time intervals for applying the signal voltage to be stored and the time intervals for extracting the stored signal voltage.*

3. A device for the storage of electrical signals comprising a target for electrons including a layer of material which is normally electrically insulating but which has the property of becoming electrically conducting when bombarded with electrons, a metal coating on one surface of said layer, a conducting electrode member on the side of said layer remote from said coating but spaced from said layer, [and electric circuit means for applying a signal voltage to be stored between said coating and said electrode member,] *electric circuit means connected between said coating and said electrode member for applying a signal voltage to be stored, and means consisting of a single electron gun for bombarding a portion of said layer with a beam of electrons for rendering such portion conductive* [said circuit means including a biasing source of potential].

4. A device for the storage of electrical signals comprising a target for electrons including a layer of material which is normally electrically insulating but which has the property of becoming electrically conducting when bombarded with electrons, a metal coating on one surface of said layer, a conducting electrode member on the side of said layer remote from said coating but spaced from said layer, *said member comprising a mesh grid,* [electric circuit means for applying a signal voltage to be stored between said coating and said electrode member, said connecting electrode comprising a mesh grid member,] *electric circuit means connected between said coating and said electrode member for applying a signal voltage to be stored,* and means *consisting of a single electron gun* for bombarding *a portion* [said uncoated surface] of said layer with a beam of electrons through said mesh grid member *for rendering such portion conductive.*

[5. A device for the storage of electrical signals comprising a target for electrons including a layer of material which is normally electrically insulating but which has the property of becoming electrically conducting when bombarded with electrons, a metal coating on one surface of said layer, a conducting electrode member on the side of said layer remote from said coating but spaced from said layer, electric circuit means for applying a signal voltage to be stored between said coating and said electrode member, said layer being capable of transmitting electrons, and means for forming a beam of electrons and for directing it through said layer.]

[6. A device for the storage of electrical signals comprising a target for electrons including material which is normally electrically insulating but which has the property of becomng electrically conducting when bombarded with electrons, a metallic member on one face of said target, a second metallic member adjacent the opposite face of said target but spaced therefrom, electric circuit means for applying a signal voltage to be stored between said two metallic members, and means for scanning said target with a beam of electrons.]

[7. A device for the storage of electrical signals comprising a target for electrons including material which is normally electrically insulating but which has the property of becoming electrically conducting when bombarded with electrons, a metallic member on one face of said target, a second metallic member adjacent the opposite face of said target but spaced therefrom, electric circuit means for applying a signal voltage to be stored between said two metallic members, and means for scanning said target with a beam of electrons, said last-mentioned means being so aligned with respect to said target that it passes through said spaced conducting member to strike said target.]

[8. A device for the storage of electrical signals comprising a target for electrons including material which is normally electrically insulating but which has the property of becomng electrically conducting when bombarded with electrons, a metallic member on one face of said target, a second metallic member adjacent the opposite face of said target but spaced therefrom, electric circuit means for applying a signal voltage to be stored between said two metallic members, and means for scanning said target with a beam of electrons, said last-mentioned means being so aligned with respect to said target that the beam passes through said metallic member on said target to strike said material.]

*9. A device for the storage of electrical signals comprising a target for electrons including a layer of material which is normally electrically insulating but which has the property of becoming electrically conducting when bombarded with electrons, a conductive coating on one surface of said layer, a conductive electrode member on the side of said layer remote from said coating but spaced from said layer, means for forming an electron beam, means for projecting said beam against a portion of the surface of said layer for rendering such portion conductive, means for sweeping said beam across the surface of said layer in successive scans, means connected between the conductive coating and the conductive electrode member for applying a signal to be stored during one scan of said beam, and means connected between said coating and said electrode member for extracting said stored signal on the next successive scan of said beam.*

*10. A device for the storage of electrical signals comprising a target for electrons including a layer of material which is normally electrically insulating but which has the property of becomng electrically conducting when bombarded with electrons, a conductive coating on one surface of said layer, a conductive electrode member on the side of said layer remote from said coating but spaced from said layer, means for forming an electron beam, means for projecting said beam against a portion of the surface of said layer for rendering such portion conductive, means for sweeping said beam across said surface in successive scans, means connected between the conductive coating and the conductive electrode member for applying a signal to be stored during one scan of said beam, and means connected between said coating and said electrode member for extracting said stored signal on a subsequent scan of said beam.*

*11. A device for the storage of electrical signals comprising a target for electrons including a layer of material which is normally electrically insulating but which has the property of becoming electrically conducting when bombarded with electrons, a conductive coating on one surface of said layer, a conductive electrode member on the side of said layer remote from said coating but spaced from said layer, means for forming an electron beam, means for projecting said beam against a portion of the surface of said layer for rendering such portion conductive, means for sweeping said beam across said layer in successive scans, a signal source, a utilization circuit, and switching means for connecting said signal source between the conductive coating and the conductive electrode member during one scan of said beam and for connecting said utilization circuit between said coating and said electrode member during a subsequent scan of said beam, whereby signals from said source are stored during said one scan and supplied to the utilization circuit during the subsequent scan.*

*12. A storage tube comprising a storage surface of material which is normally an insulator but becomes conducting under high velocity electron bombardment, an electrode adjacent to and spaced from the front face of said storage surface, a source of signal information to be stored, a conductive plate on the back face of said storage surface, means for producing a high velocity electron beam and for directing said beam against a portion of said storage surface for rendering such portion conductive, means for sweeping said high velocity beam in successive scanning cycles across said surface for alternately storing said signal information on said surface and reproducing the stored signal information from said surface on successive cycles, a utilization circuit for receiving the reproduced signal information, and switching means for connecting alternately the signal source and utilization circuit between said conductive plate and said electrode, the signal source being connected on the storing sweep of said beam and the utilization circuit being connected on the reproducing sweep of said beam.*

*13. A device for the storage of electrical signals comprising a target for electrons including a layer of material which is normally electrically insulating but which has the property of becoming electrically conducting when bombarded with electrons, an apertured conductive coating on one surface of said layer, an electrode member on the side of said layer remote from said coating but spaced from said layer, means consisting of a single electron gun for projecting an electron beam through said apertured conductive coating into a portion of said layer for rendering such portion conductive, and electrical circuit means connected between said coating and said electrode member for applying a signal voltage to be stored.*

*14. A device for the storage of electrical signals comprising a target for electrons including a layer of material which is normally electrically insulating but which has the property of becoming electrically conducting when bombarded with electrons, a conductive coating on one surface of said layer, an apertured electrode member on the side of said layer remote from said coating but spaced from said layer, means consisting of a single electron gun for projecting an electron beam through said apertured electrode member into a portion of said layer for rendering such portion conductive, and electrical circuit means connected between said coating and said electrode member for applying a signal voltage to be stored.*

(References on following page)

References Cited in the file of this patent or the original patent

UNITED STATES PATENTS

| | | |
|---|---|---|
| 2,124,057 | Farnsworth | July 19, 1938 |
| 2,277,007 | Von Ardenne | May 17, 1942 |
| 2,277,008 | Von Ardenne | May 17, 1942 |
| 2,460,093 | Law | Jan. 25, 1949 |
| 2,462,569 | Sziklai | Feb. 22, 1949 |
| 2,470,875 | Snyder, Jr. | May 24, 1949 |